United States Patent [19]

Wüst et al.

[11] 4,339,573

[45] Jul. 13, 1982

[54] PREPARATION OF CELLULOSE DERIVATIVES USING HIGHLY REACTIVE ALKALI CELLULOSE

[75] Inventors: Willi Wüst, Ratingen-Hösel; Hasso Leischner; Wilfried Rähse, both of Düsseldorf; Franz-Josef Carduck; Norbert Kühne, both of Haan, all of Fed. Rep. of Germany

[73] Assignee: Henkel Kommanditgesellschaft auf Aktien, Düsseldorf-Holthausen, Fed. Rep. of Germany

[21] Appl. No.: 165,868

[22] Filed: Jul. 7, 1980

[30] Foreign Application Priority Data

Jul. 18, 1979 [DE] Fed. Rep. of Germany ....... 2929002

[51] Int. Cl.$^3$ .......................... C08B 1/06; C08B 1/08; C08B 11/02; C08B 11/193
[52] U.S. Cl. ...................................... 536/84; 536/91; 536/98; 536/99; 536/101
[58] Field of Search ...................... 536/101, 84, 91, 99, 536/98

[56] References Cited

U.S. PATENT DOCUMENTS

| | | | |
|---|---|---|---|
| 2,296,829 | 9/1942 | Barry | 536/101 |
| 2,619,483 | 11/1952 | Wilcox et al. | 536/101 |
| 2,977,355 | 3/1961 | Bradshaw et al. | 536/101 |
| 3,255,071 | 6/1966 | Kleinert | 536/101 |

FOREIGN PATENT DOCUMENTS

| | | | |
|---|---|---|---|
| 458977 | 6/1945 | Belgium . | |
| 496725 | 10/1953 | Canada | 536/101 |
| 200816 | 11/1924 | United Kingdom | 536/101 |
| 250617 | 5/1927 | United Kingdom | 536/101 |
| 546647 | 7/1942 | United Kingdom . | |

OTHER PUBLICATIONS

Comptes Rendus Hebdomadaires des Séances de l'Academie des Sciences, Band 238, 1954, France—pp. 1318–1320.

*Primary Examiner*—Ronald W. Griffin
*Attorney, Agent, or Firm*—Hammond & Littell, Weissenberger and Muserlian

[57] ABSTRACT

This invention relates to an improved process for preparing cellulose derivatives by alkalizing cellulose to form alkali cellulose, alkylating the alkali cellulose to form alkylated alkali cellulose, and recovering the alkylated alkali cellulose. According to the process of the invention, finely-divided, preferably powdered, cellulose is reacted with an aqueous-alcoholic alkali metal hydroxide solution at a temperature of from about 20° to 120° C., to form alkali cellulose, oxygen is removed, and the water content is reduced to from about 2.5 to 6.0 moles per anhydroglucose unit, prior to alkylization.

16 Claims, No Drawings

PREPARATION OF CELLULOSE DERIVATIVES USING HIGHLY REACTIVE ALKALI CELLULOSE

FIELD OF THE INVENTION

This invention is directed to a process for preparing cellulose derivatives. More particularly, this invention is directed to a process for preparing cellulose derivatives by reacting highly reactive alikali cellulose with etherifying agents.

BACKGROUND OF THE INVENTION

It is known from the literature that the preparation of reactive, uniformly alkalized cellulose and uniformly substituted cellulose derivatives presents great difficulties. According to a well-known and widely used method for the production of alkali cellulose, cellulose fibers or cellulose chips are dipped into solutions of from about 20 to 50% of sodium hydroxide. Excess solution is squeezed off after this dip-alkalization. (See, German Pat. No. 977,104.) In alkalization in mixing systems, the required amount of sodium hydroxide can be adjusted more accurately by spraying, as is set forth in German Published Application (DOS) No. 26 35 403.

However, the two above-described methods yield an irregular distribution of the alkali metal on the cellulose, which distribution is manifested by irregular substitution after reaction with etherifying agents. Such products do not exhibit the readily dissolving properties of uniformly substituted cellulose ethers. In view of these facts, it has been standard procedure to grind the cellulose before alkalization to obtain a large surface area and a high reaction velocity. However, during alkalization, partially alkalized cellulose powder swells considerably and forms lumps so that a homogeneous distribution of the alkali metal hydroxide on the cellulose powder is not ensured. It has been necessary for the alkalization of fibrous or powdered cellulose to use, for example, a screw press, to homogenize and advance the material [German Published Application (DAS) No. 15 43 114] or to work in the presence of an etherifying agent in a mixer [DOS 26 35 403].

While use of a screw press or another pressure device may be suitable under certain circumstances, alkalization in the presence of an etherifying agent, for example, methyl chloride, requires an apparatus capable of containing pressure, since a considerable excess pressure builds up due to the temperature conditions. Under these conditions, a suspension of cellulose powder, sodium hydroxide, and methyl chloride can be produced, as is described in German Published Application (DOS) No. 26 36 935. However, the preparation of such a suspension is not equivalent to the production of a homogeneously alkalized cellulose.

OBJECTS OF THE INVENTION

It is an object of the invention to provide a novel process for the preparation of cellulose derivatives.

It is also an object of the invention to provide a process for the preparation of cellulose derivatives using highly reactive alkali cellulose.

It is a further object of this invention to improve the quality of the alkali cellulose and thus of the cellulose ethers, for example, alkyl cellulose, such as methyl cellulose, hydroxyalkyl cellulose, and carboxyalkyl cellulose.

These and other objects of the invention will become more apparent in the discussion below.

DESCRIPTION OF THE INVENTION

According to the process of the invention, finely-divided, especially powdered cellulose is converted with aqueous-alcoholic alkali metal hydroxide solution at a temperature of from about 20° to 120° C., preferably from about 30° to 80° C., to alkali cellulose. The alkali cellulose is then alkylated in known manner and worked up after the oxygen is removed and the water content is reduced to about 2.5 to 6.0 moles per anhydroglucose unit. The yields, particularly as far as the amount of sodium hydroxide is concerned, are increased as compared to the known procedures. Also, the alkali cellulose prepared is highly reactive and has wide applicability in the known secondary reactions.

The reaction between the cellulose and the alkali metal hydroxide for the formation of the alkali cellulose is exothermic, that is, the heat of the reaction generated either heats the reaction mixture or must be eliminated. For the production of the highly reactive alkali cellulose according to the invention, the above-mentioned definitive temperature range must be maintained. Preferably a comminuted, preferably powdered, cellulose is used, which cellulose has a mean particle size of from about 20 to 120$\mu$, preferably of from about 40 to 60$\mu$. It is possible to use various types of cellulose.

It has been found that the viscosity of the aqueous solution of the ether produced increases with the increasing average degree of polymerization (DP) of the cellulose powder used. The alkali metal hydroxide solution employed should be as concentrated as possible and have a hydroxide content of from about 30 to 70%, based on the total amount of hydroxide and water. Potassium and sodium hydroxide, are the alkali metal hydroxides most often employed, sodium hydroxide being preferred for economical reasons. Naturally it is also possible to use mixtures of alkali metal hydroxides. The amount of alkali metal hydroxide to be used depends on the desired degree of substitution and should be carried out with molar ratios of alkali metal hydroxide to cellulose of from about 1.5:1 to 5:1.

The alkalization according to the invention, which can be carried out continuously or intermittently, has several special features and numerous advantages as compared to the presently known methods.

Any inert solvent can be used for carrying out the process of the invention, but the presence of a solvent is not required. The powdered cellulose suspended in the from about 6- to 30-fold, preferably from about 8- to 13-fold, amount of inert solvent, for example, toluene, xylene, or isopropyl alcohol, is reacted with an alcoholic alkali metal hydroxide solution. The preferred aqueous alkali metal hydroxide solution is sodium hydroxide, particularly in the 50% form, while methanol and/or ethanol should be used for dilution. Good results are also obtained with other alkali metal hydroxide solutions and/or alcohols. Particularly suitable are monoalcohols, especially alkanols, with from 1 to 5 carbon atoms in the molecule. It is preferred to use a sodium hydroxide/methanol system due to economic considerations.

The alkalization is effected at temperatures of from about 15° to 75° C. Depending on the procedures, as well as on the required viscosity of the product, the optimum alkalization temperature varies within the above-mentioned range, preferably from about 25° and 45° C. When alcoholic dispersing agents are used, such as tert-butanol or isopropanol, only the concentrated aqueous alkali metal hydroxide solution is required for alkalization since the alcohol present ensures a homogeneous distribution.

Another advantage of the use of an alcoholic alkali metal hydroxide solution system is that the alkali metal hydroxide liquor is absorbed immediately and perfectly evenly on the suspended cellulose powder. With this method a completely homogenous alkali cellulose is obtained within a few seconds or minutes. The cellulose swells rapidly and intensively.

Continuous alkalization is carried out, for example, in a homogenizer equipped with a rotor-stator. This homogenizer can be replaced by a centrifugal pump without the alkali cellulose losing its properties. The alkalization is effected in these systems in fractions of a second, and can be extended into the range of seconds by recycling the major part of the suspension.

Intermittent alkalization in the agitator vessel is preferably carried out for from about one minute to one hour. The alkalization time varies depending on the size of the batch. It is advisable to add alkali metal hydroxide to the suspension at a rate from about 100 to 500 kg/l. The alkalization is also effected in the agitator vessel, preferably in the presence of alcohol, particularly if highly viscous products are desired.

To prevent oxidative decomposition of the cellulose molecule, it is advisable to effect the alkalization in a nitrogen atmosphere. This can be accomplished by forcing nitrogen through the suspension in finely divided form under pressure. However, this measure alone is not sufficient to remove the existing oxygen, because oxygen is adsorbed on the surface of the extremely finely divided cellulose powder and is very difficult to remove.

According to the invention, the air contained in the reaction system, that is, the oxygen, is therefore removed by boiling the suspension liquid in vacuo. In continuous operation, the suspension of the alkali cellulose is flushed into an agitator vessel, which is under vacuum; and, in intermittent operation, air, that is, oxygen, is withdrawn from the system with the boiling dispersing agent under reduced pressure. Depending on the procedure, the temperature and the pressure are varied for this degassing stage. In the range of from about 30° to 100° C., the corresponding pressures range from 30 torr to normal pressure. Preferably the degassing should be effected at temperatures of from about 40° to 65° C. under boiling liquid, that is, by means of a corresponding vacuum. The evaporated liquid returns at least partly into the reactor after condensation, depending on the required product properties, or is worked up separately.

Another essential feature of the invention is the dehydration of the alkali cellulose. It can take place simultaneously with the degassing under boiling or distilling liquid, or be effected subsequently in a separate stage. If the dehydration is in a separate stage, it is advisable to effect the dehydration at temperatures which are from about 10° to 30° C. higher.

In the dehydration and degassing stage, both alcohol and excess water are removed by azeotropic distillation, particularly when hydrocarbons are used which are not miscible with water. The degree of substitution can also be varied infinitely, or over a wide range, by the degree of dehydration, depending on the amount of alkali metal hydroxide used. Thus, for example, in the methylation of alkali cellulose for a stoichiometric mixture, the degree of methoxyl substitution in the range of from about 1.0 to 1.9 can only be adjusted by the degree of dehydration. The dehydration is so effected with higher substituted products that water content is reduced to from about 2.5 to 6.0 moles of anhydroglucose unit, particularly from about 3.5 to 4.0 moles. The molar ratio of methyl chloride to NaOH is preferably from about 1.0:1 to 1.5:1, especially from about 1.1:1 to 1.3:1.

The alkali cellulose, degassed and dehydrated as described above, is subsequently alkylated in known manner, using either a continuous or intermittent method. There are various steps for processing the alkali cellulose. For example, it is possible to alkylate the alkali cellulose itself or a pre-alkylated form, with methyl chloride and/or ethylene oxide and/or propylene oxide. Furthermore, the alkali cellulose produced according to the invention or the alkylated form can be reacted with chloracetic acid or its alkali metal salts. It is also possible to react other known reagents which effect alkylation with the alkali cellulose obtained according to the invention.

Another feature of the invention is that optimum alkalization can also be achieved with substoichiometrical amounts of sodium hydroxide. If the molar ratio of sodium hydroxide to anhydroglycose is designated as $\alpha$, a value of 3 is obtained for a stoichiometric mixture. At $\alpha$ values of 1.5, it is already possible to obtain an alkalization which permits the manufacture of good products. Surprisingly, it has been found that the substitution rate (selectivity) increases greatly with a reduction of the molar ratio of sodium hydroxide to anhydroglycose. While the selectivity in the known methods is from about 40 to 50%, it can be increased to over 80% by setting optimum test conditions. It is of particular importance that these values are achieved both for methyl chloride and for alkylene oxides.

The adjustment of the viscosity in the above-described method is particularly simple. According to the invention, the degassing time is reduced by slightly reducing the viscosity. A further reduction is characterized by the absence of degassing and by additional thermal decomposition of the alkali cellulose. By selection of the time and temperature, it is possible to adjust the viscosity in the range from about 500 to 25,000 mPas with an accuracy of ±5%. If viscosities under 500 mPas are desired, the relative error increases to ±10% and more.

If the alkali cellulose produced according to the invention is used, an excess is not necessary in the reaction with methyl chloride. If the molar ratio of methyl chloride to sodium hydroxide is designated as $\beta$, the methylation ratio can also be carried out with a stoichiometric amount ($\beta = 1$) without any great loss in quality. Usually a $\beta$-value of from about 1.05 to 1.5 is used, preferably from about 1.1 to 1.3.

The superiority of the products which were synthesized from the alkali cellulose produced according to the invention results, for example, from the fact that even low-substituted methyl celluloses, which are otherwise only soluble in alkaline solutions, dissolve easily in water. This suggests a very uniform substitution, which is only possible with a completely homogeneous alkalization of the cellulose. In addition, the celluloses alkalized this way can be very easily co-etherified at the same time, whereby products with interesting solution properties are obtained. All other co-etherifications are also possible.

The following examples are intended to illustrate the invention and are not to be construed as limiting the invention thereto.

EXAMPLES

EXAMPLE 1

Eighty kilograms of powdered pine cellulose (particle size diameter of 40 to 60μ) were suspended in 1000 liters of toluene and then alkalized with 126 kg of 50% aqueous sodium hydroxide solution and 50 kg of methanol. Degassing of the alkali cellulose was effected by applying a vacuum of about 100 torr at 30° C., after which dehydration was carried out under boiling at 30° to 60° C. Following the dehydration, where 400 liters of liquid were withdrawn from the system, 14 kg of ethylene oxide and then 96 kg of methyl chloride were added to the reaction vessel. The reactions took place within a temperature range of from 60° to 120° C. with a 99.5% completion rate.

A maximum excess pressure of 6.4 bar was obtained. A methyl-hydroxyethyl cellulose with the following characteristics was obtained after the common salt was removed:

| | |
|---|---|
| Viscosity (2% solution) | 25,000 mPas |
| Coefficient of turbidity | 15% |
| Flocculation point | 75° C. |
| Methoxyl value | 26.1% |
| Hydroxyethyl value | 8.7% |

EXAMPLE 2

Forty kilograms of cellulose powder were mashed continuously per hour in 400 kg of toluene in a vessel. Spontaneous formation of alkali cellulose was effected at 35° to 40° C. with 74 kg per hour of an aqueous-methanolic sodium hydroxide solution containing 33% NaOH. Degassing and dehydration were effected in another agitator vessel; in this continuous method, both processes were effected in one stage under boiling of the suspension liquid at about 50° C. in a weak vacuum, 100 liters of liquid being withdrawn per hour from the system. After the addition of 2 kg of ethylene oxide and 35 kg of methyl chloride, alkylation was effected at from 95° to 130° C. in a reactor system consisting of a tubular reactor and a stirring column. The properties of the product were as follows:

| | |
|---|---|
| Viscosity | 12,800 mPas |
| Coefficient of turbidity | 58% |
| Flocculation point | 74° C. |
| Methoxy value | 23% |
| Hydroxyethyl value | 3.2% |

EXAMPLE 3

Forty kilograms of cellulose powder were suspended per hour in 400 kg of 85% aqueous isopropyl alcohol. After continuous addition of the reactants in a molar ratio of 1.0:1.4:1.31 (cellulose:NaOH:sodium monochloroacetate) the reaction to carboxymethyl cellulose was effected under pressure in a stirred column. The reaction time was 20 minutes at from 95° to 110° C. The product, which was washed salt-free with isopropyl alcohol/water, was practically free of swelling substances. The product had the following properties:

| | |
|---|---|
| Viscosity | 3,900 mPas |
| Coefficient of turbidity (3.5 cm layer thickness) | 8% |
| Degree of substitution | 0.96 |

EXAMPLE 4

Eighty kilograms of cellulose powder were alkalized in a discontinuous agitated vessel after suspension in 1200 liters of toluene with 79 kg of 50% aqueous sodium hydroxide solution and addition of about 48 kg of methanol. After degassing and dehydration, which were carried out in analogy to Example 1, the alkylation was effected with 2.2 kg of ethylene oxide and 60 kg of methyl chloride. The pressure in the reaction vessel rose at 130° C. to about 4 bar excess pressure.

The synthesized methyl-hydroxyethyl cellulose had the following properties:

| | |
|---|---|
| Viscosity | 22,000 mPas |
| Coefficient of turbidity | 28% |
| Flocculation point | 81° C. |
| Methoxy value | 23.7% |
| Hydroxyethyl value | 3.2% |

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. In the process for the preparation of cellulose derivatives by alkalizing finely divided cellulose to form alkali cellulose, alkylating the alkali cellulose to form alkylated alkali cellulose, and recovering the alkylated alkali cellulose, the improvement which comprises reacting said cellulose with an aqueous-alcoholic alkakli metal hydroxide solution at a temperature of from about 20° to 120° C., to form alkali cellulose, removing all of the oxygen therefrom, and reducing the water content to from about 2.5 to 6.0 moles per anhydroglucose unit, prior to alkylation of said alkali cellulose.

2. The process of claim 1, wherein the cellulose is reacted at a temperature of from about 20° to 80° C.

3. The process of claim 1, wherein powdered cellulose is used which has a mean particle diameter of from about 20 to 120μ.

4. The process of claim 3, wherein the mean particle diameter is from about 40 to 60μ.

5. The process of claim 1, wherein primary and/or secondary alkanols with from 1 to 5 carbon atoms, are used in the alkalization.

6. The process of claim 5, wherein methanol and/or ethanol are used in the alkalization.

7. The process of claim 1, wherein the alkalization is carried out with molar ratios of alkali metal hydroxide to cellulose of from about 1.5:1 to 5:1.

8. The process of claim 1, wherein the viscosity of the alkali cellulose is adjusted by time-limited degassing and/or alkaline thermal decomposition in a temperature range of from about 30° to 100° C. and in a pressure range of from 30 torr to normal pressure.

9. The process of claim 8, wherein the temperature range is from about 40° to 65° C.

10. The process of claim 1, wherein the alkali metal hydroxide is sodium hydroxide, the etherification agent is methyl chloride, and the molar ratio of methyl chloride to sodium hydroxide is from about 1.0:1 to 1.5:1.

11. The process of claim 10, wherein the molar ratio of methyl chloride to sodium hydroxide is from about 1.1:1 to 1.3:1.

12. The process of claim 1, wherein excess water and alcohol are removed in the presence of inert liquids not miscible with water.

13. The process of claim 12, wherein the inert liquid is toluene or xylene.

14. The process of claim 1, wherein the process is effected in the presence of inert liquid in continuous operation.

15. The process of claim 1, wherein alkali cellulose or alkali cellulose partly reacted with monochloroacetic acid or an alkali metal salt thereof is alkylated with methyl chloride, ethylene oxide, propylene oxide, or a mixture thereof.

16. The process of claim 1, wherein alkali cellulose or partially alkylated alkali cellulose is reacted with chloroacetic acid or an alkali metal salt thereof.

* * * * *